Figure 1:
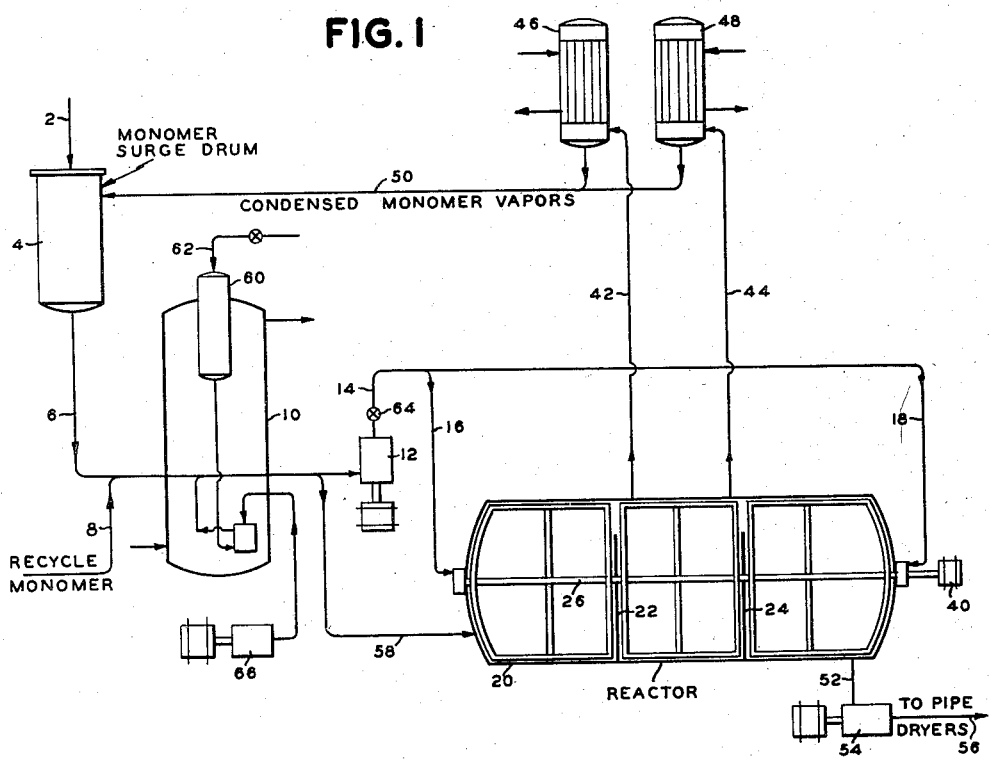

June 10, 1958 L. KEAN 2,838,380
POLYMERIZATION APPARATUS
Original Filed Dec. 14, 1954

INVENTOR.
LEONARD KEAN
BY
ATTORNEYS

United States Patent Office 2,838,380
Patented June 10, 1958

2,838,380
POLYMERIZATION APPARATUS

Leonard Kean, New York, N. Y., assignor, by mesne assignments, to Minnesota Mining and Manufacturing Company, St. Paul, Minn., a corporation of Delaware Original application December 14, 1954, Serial No. 475,222. Divided and this application April 2, 1956, Serial No. 579,701

3 Claims. (Cl. 23—285)

This invention relates to a polymerization apparatus for the preparation of normally solid perhalogenated polymers. More particularly, the invention relates to an improved continuous apparatus for the production of solid polymers of chlorotrifluoroethylene. This application is a division of Serial No. 475,222 filed December 14, 1954.

One method presently employed for the preparation of chlorotrifluoroethylene polymer, both homopolymers and copolymers, is a batch type of operation. In this operation the monomer is introduced into a reaction bomb together with a suitable promoter, and the temperature of the bomb is maintained about $-16°$ C. or $-17°$ C. for a period of about seven days. During this period the monomer polymerizes and forms a porous plug of solid polymer in the reaction bomb in a yield of about 30 to 50 percent, based upon the weight of monomer charged. The unreacted monomer is occluded in the interstices of the porous plug and is removed therefrom by heating the reaction bomb under subatmospheric pressure to evaporate the unreacted monomer. The dried porous plug of polymer is then removed from the reaction vessel and broken into chips for handling and shipment.

The bomb reactor is about 6 inches in diameter and is placed in a liquid cooling bath. Larger diameter bombs cannot be used because of the poor heat transfer of the monomer and solid polymer.

The bomb type of operation has certain inherent disadvantages, among which is the fact that the equipment is cumbersome and has a relatively low capacity and the labor costs involved are high. The product, however, is produced in high yield, and the purity and physical characteristics thereof are exceptionally good.

In copending application Serial No. 309,434, filed September 13, 1954, now Patent No. 2,742,454, there is disclosed the polymerization of perhalogenated olefins containing fluorine to produce both solid homopolymers and copolymers. A perhaloolefin is defined as an olefin consisting of carbon and halogen with any degree of unsaturation, and preferably the perhaloolefin is a monoolefin and contains chlorine in addition to fluorine. According to the disclosure of the above-identified copending application, a saturated fluorochloro carbon is dechlorinated under suitable conditions of dichlorination in the presence of a metallic dehalogenating agent, such as zinc, to produce a perfluorohalomonoolefin as a monomer for subsequent polymerization. The dechlorination is carried out in the presence of a suitable solvent, such as methanol or ethanol, and the crude monomer effluent containing both higher boiling and lower boiling contaminants is removed from the dechlorination reactor and purified. The major contaminants of the crude monomer are the solvent, such as methanol, and perhalocarbons and the crude monomer is water washed to remove substantially all of the methanol or other water soluble solvent. After the water washing, the monomer is dried under conditions such that the monomer contains less than 100 parts per million and preferably less than 10 parts per million of water and is then distilled to remove low boiling impurities. After removal of the low boiling impurities, the monomer bottoms from the first distillation are subjected to a second distillation to remove the high boiling impurities. Best results are obtained by distillation at pressures above 100 p. s. i. g. Thereafter, the purified monomer is polymerized in a horizontal flow elongated reactor to form a slurry of solid polymer and monomer having a solids concentration of not more than about 12 weight percent. The polymerization is generally effected at a temperature between about 0° F. and about 60 to 70° F. under liquid phase conditions for a period of time between about 2 and about 40 hours. The slurry of polymer and monomer is then dried at an elevated temperature to recover the polymer as a product of the process. At least a portion of the recovered monomer is recycled to the purification step to prevent the build up of impurities in the recycle.

It has been found that during the polymerization there is a rapid build up of solid polymer on the walls of the reactor, particularly at the liquid-vapor interface, until the vessel becomes solidly plugged up after a few weeks of operation.

In accordance with the present invention, apparatus is provided consisting of a hollow bladed rotary scraper for use within the polymerization reactor, which has the triple effect of scraping polymer off of the reactor walls, thoroughly agitating the slurry of polymer and monomer, and, in order to prevent further build up, sprays are provided which flush the blades of the scraper and the reactor walls with monomer issuing from numerous small orifices in the scraper blades. The rotary scraper blades are constructed to have a close clearance with the reactor walls; normally, clearance between the blades and the reactor wall is ⅛ inch.

The angle of ejection of the monomer from each orifice may be such that the forward movement of the blade tends to spread the monomer along the entire length of the blade. Monomer is pumped into the hollow rotary scraper through packing glands at either end thereof, and a small amount of monomer is used continuously to flush the bearings supporting the hollow scraper to prevent seizing thereof due to the entry of polymer between the bearing surfaces. Polychlorotrifluoroethylene oil is used as a sealing fluid as well as a lubricant.

The process of the present invention may be used for the homopolymerization of chlorotrifluoroethylene and for the copolymerization of chlorotrifluoroethylene with other halogenated fluorine-containing olefins having more hydrogen atoms than the number of carbon atoms. Such copolymerizations include the copolymerization of chlorotrifluoroethylene with tetrafluoroethylene, perfluoropropene, perfluorobutadiene, vinylidene fluoride, trifluoroethylene, monofluoromonochloroethylene, monofluorotrichloroethylene, and difluorodichloropropene. In copolymerizations it is usually preferred to use between about 5 and 95 weight percent of comonomer with chlorotrifluoroethylene. The conditions of polymerization of the copolymers of chlorotrifluoroethylene are substantially the same as those used for the homopolymerization of chlorotrifluoroethylene.

The promoters which are used in the polymerization process of the present invention are preferably organic peroxides, and substituted acetyl peroxides, such as trichloroacetyl peroxide, are preferred. Other suitable organic peroxides are trifluoroacetyl peroxide, difluoroacetyl peroxide, 2,4-dichlorobenzoyl peroxide, chloroacetyl peroxide, trifluorodichloropropionyl peroxide, and dichlorofluoroacetyl peroxide.

Figure 2:
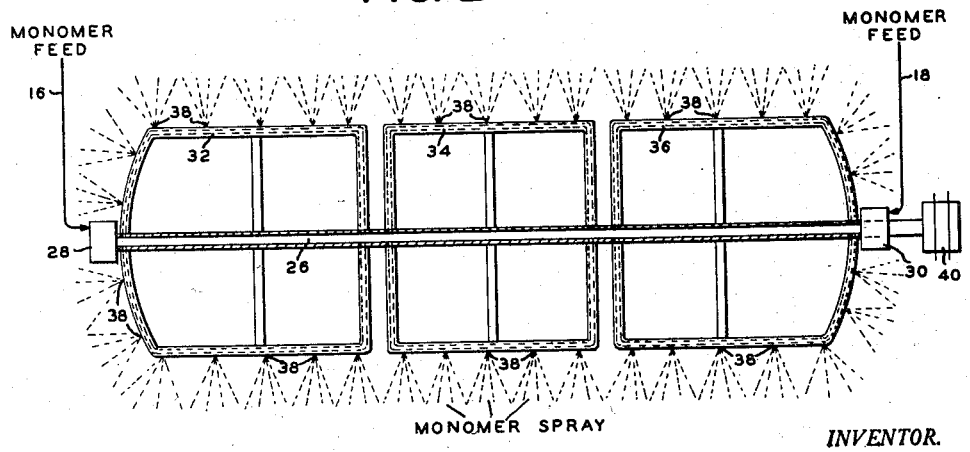

Referring to the accompanying drawings in which one embodiment of the present invention is shown, Figure 1 is a flowsheet of the improved process of the invention and Figure 2 is a detailed view of the scraping, agitating and spraying means used in the polymerization reactor of the invention.

Referring to Figure 1 of the drawings, purified chlorotrifluoroethylene monomer is passed from a purification section, not shown, through the conduit 2 to the monomer surge drum 4 and is withdrawn from the surge drum 4 through the conduit 6, where it is mixed with recycle monomer in the liquid phase added to the conduit 6 from the conduit 8. The mixed streams of monomer are passed, in the conduit 6, through the promoter feed tank 10, which is maintained under refrigeration, and the monomer stream is thereby maintained at a low temperature.

The cold monomer stream is then transferred by means of the pump 12 through the conduit 14 and the conduits 16 and 18, respectively, to the packing glands at either end of the polymerization reactor 20. The polymerization reactor 20 consists of an elongated vessel having a pair of baffles 22 and 24, respectively, therein which do not extend to the top of the vessel. The baffles divide the reactor into three compartments or sections, and the baffles are provided with apertures, not shown, near the bottom thereof for the flow of materials from one compartment to the next.

The baffles are also provided with smaller apertures for the passage of the hollow shaft 26 of the combined scraper, agitator, and sprayer, best shown in Figure 2 of the drawings.

As seen in Figure 2 of the drawings, the combined scraper, agitator, and sprayer consists of the hollow shaft 26, having the packings 28 and 30 at either end thereof, through which the monomer is fed to the hollow shaft. A plurality of hollow blades, which may be of any desired number, are mounted on the hollow shaft. Three hollow blades 32, 34, and 36, respectively, are shown in Figure 2 of the drawings. It is necessary that the blades be made separate and that at least three of them be provided on the shaft in order to accommodate the reactor partitions or baffles between the blades. Each of the hollow blades 32, 34, and 36 is provided with a plurality of orifices 38 on the surface thereof through which the monomer issues under pressure as a fine spray, thereby serving to efficiently wash the surfaces of the blades and the walls of the reactor. The orifices 38 may be of any desired size, and a diameter of 1/64 inch provides good results. The entire scraping, agitating, and spraying assembly is rotated by the electric motor 40 operatively engaged with one end of the hollow shaft 26.

The reactor 20 is cooled by auto refrigeration, i. e., the cooling action resulting from the evaporation of monomer from the slurry surface, as the reactor is maintained about one-half full at all times. Monomers in the vapor phase are withdrawn from the vapor space of the reactor 20 through the conduits 42 and 44, best shown in Figure 1 of the drawings, and are passed to the heat exchangers 46 and 48, respectively, where they are condensed and cooled to a temperature of 32° F. The condensed monomer vapors are then returned through the conduit 50 to the monomer surge drum 4.

A slurry of solid polymer product in unreacted monomer is continuously withdrawn through the conduit 52 and passed by means of the pump 54 and the conduit 56 to a series of pipe driers, not shown, where the unreacted monomer is flashed off, condensed, and recycled to the process through the conduit 8. The solid polymer product is recovered as a product of the process.

Periodically, the monomer may be by-passed from the promoter feed tank through the conduit 58 to the bottom of the reactor, permitting the dual function of reading the reactor slurry level on the surge drum gauge glass, and also the injection of the promoter. The promoter, such as trichloroacetyl peroxide, is fed into the conduit 6 from the vessel 60 mounted in the top of the tank 10, by means of an inert gas such as nitrogen, which is pressured into the vessel 60 through the conduit 62. The monomer stream containing the promoter is then injected into the reactor 20 through the conduit 58 by closing the valve 64 in the conduit 14 and actuating the promoter feed pump 66. This method of promoter injection prevents plugging of the agitator orifices resulting from the initiation of polymerization by the promoter.

More particularly, in the process of the invention, 684 pounds per hour of chlorotrifluoroethylene monomer at a temperature of 10° F. are received into the monomer surge drum 4 from the purification section together with 2030 pounds per hour of condensed monomer vapor. This mixture, with 2167 pounds per hour of recycle monomer, is passed into the promoter feed tank 10 through the conduit 8. The combined monomer stream, amounting to 4,881 pounds per hour, is then transferred to the reactor by the pump 12 through the conduit 14 and conduits 16 and 18 to the packing glands at each end of the scraping, agitating, and spraying device. The monomer is pressured into the reactor at elevated pressures of the order of 60 p. s. i. g. At intervals of one-half hour or one hour, promoter is added to the monomer stream at a rate of 7.6 pounds per hour, and the mixture of monomer and promoter is by-passed through the conduit 58 to the bottom of the reactor 20. As the polymerization proceeds, monomer vapors are withdrawn from the vapor space of the reactor 20 through the conduits 42 and 44 and condensed in the heat exchangers 46 and 48, respectively. Condensed monomer vapors, amounting to 2030 pounds per hour, are returned to the monomer surge drum 4 through the conduit 50 from the heat exchangers.

As the combined scraping, agitating, and spraying mechanism rotates, the walls of the reactor 20 are continuously scraped while the slurry is simultaneously agitated. The monomer spray issuing from the orifices 38 in the hollow scraper blades continuously washes the reactor walls and the blades themselves, thereby resulting in an efficient operation in which no build up on the reactor walls occurs.

A slurry containing at least about 6 percent and not in excess of about 12 percent solids is continuously withdrawn through the conduit 52 and passed by means of the pump 54 and the conduit 56 to a series of pipe driers, not shown. This slurry is withdrawn at the rate of 2851 pounds per hour, and 171 pounds per hour of dry polymer product are obtained by flashing off the unreacted monomer and recycling it to the process.

It will be obvious to those skilled in the art that many modifications may be made within the scope of the present invention without departing from the spirit thereof, and the invention includes all such modifications.

I claim:

1. In a device of the character described, a vessel having a plurality of partitions positioned in the bottom of said vessel which divide said vessel into sections having open communication at the top, a common hollow rotatable shaft therein and common to each of said sections, a hollow blade secured to said shaft and conforming in shape to the shape of the vessel and closely adjacent to the surface of the vessel whereby said blades function as a scraper, a plurality of orifices in said blade directed only towards the wall of the vessel and means connecting the orifices with the channel in the hollow shaft.

2. A polymerizer comprising a generally elongated vessel having a plurality of partitions positioned in the bottom of said vessel which divide said vessel into sections having open communication at the top, and a common hollow rotatable shaft mounted therein and common to each of said sections, a plurality of hollow blades secured to said shaft and conforming in shape to the shape of the vessel and closely adjacent to the surface of the vessel whereby said blades function as a scraper, a plurality of orifices in said blades directed only towards the walls of the vessel and means connecting the orifices with the channel in the hollow shaft.

3. A polymerizer comprising a generally elongated vessel having a plurality of partitions positioned in the bottom of said vessel which divide said vessel into sections having open communication at the top, and a common hollow rotatable shaft mounted therein and common to each of said sections, a plurality of hollow blades secured to said shaft and conforming in shape to the shape of the vessel and closely adjacent to the surface of the vessel whereby said blades function as a scraper, a plurality of orifices in said blades directed only towards the walls of the vessel, means connecting the orifices with the channel in the hollow shaft, and means for withdrawing vapor phase materials from the vessel.

References Cited in the file of this patent

UNITED STATES PATENTS

| | | |
|---|---|---|
| 1,768,075 | Kipper | June 24, 1930 |
| 2,459,636 | Fenney | Jan. 18, 1949 |